US012789643B2

(12) United States Patent
Chetty et al.

(10) Patent No.: US 12,789,643 B2
(45) Date of Patent: Nov. 10, 2026

(54) DISTURBANCE REJECTION IN DRIVELINE

(71) Applicant: Atieva, Inc., Newark, CA (US)

(72) Inventors: Aditya Chetty, Newark, CA (US); Sameer Sudhir Deshmukh, Milpitas, CA (US); Justin Campanaro, San Francisco, CA (US)

(73) Assignee: Atieva, Inc., Newark, CA (US)

( * ) Notice: Subject to any disclaimer, the term of this patent is extended or adjusted under 35 U.S.C. 154(b) by 78 days.

(21) Appl. No.: 18/749,151

(22) Filed: Jun. 20, 2024

(65) Prior Publication Data

US 2025/0388095 A1 Dec. 25, 2025

(51) Int. Cl.
*B60L 15/20* (2006.01)
*B60L 3/06* (2006.01)

(52) U.S. Cl.
CPC ............. *B60L 15/2054* (2013.01); *B60L 3/06* (2013.01); *B60L 2240/423* (2013.01); *B60L 2240/486* (2013.01); *B60L 2240/80* (2013.01); *B60L 2250/26* (2013.01)

(58) Field of Classification Search
CPC .. B60L 15/2054; B60L 3/06; B60L 2240/423; B60L 2240/486; B60L 2240/80; B60L 2250/26
See application file for complete search history.

(56) References Cited

U.S. PATENT DOCUMENTS

| | | | |
|---|---|---|---|
| 8,954,215 B2 | 2/2015 | Yamazaki et al. | |
| 9,509,240 B2 | 11/2016 | Holveck | |
| 9,789,871 B1 | 10/2017 | Dlala et al. | |
| 10,256,762 B2 | 4/2019 | Huh et al. | |
| 11,413,972 B2 | 8/2022 | Gauthier | |
| 11,418,140 B2 | 8/2022 | Tang | |
| 2006/0036402 A1* | 2/2006 | Deller | F15B 19/005 702/183 |
| 2014/0062345 A1* | 3/2014 | Orita | H02P 31/00 318/15 |
| 2018/0072306 A1* | 3/2018 | Yamazaki | B60W 20/15 |
| 2020/0391598 A1* | 12/2020 | Lee | H02P 6/08 |
| 2025/0001877 A1* | 1/2025 | Oh | B60L 15/20 |
| 2025/0376045 A1* | 12/2025 | Jones | B60L 15/2036 |

FOREIGN PATENT DOCUMENTS

| | | |
|---|---|---|
| WO | 2023069883 A1 | 4/2023 |
| WO | 2023076942 A1 | 5/2023 |
| WO | 2023077081 A1 | 5/2023 |

OTHER PUBLICATIONS

International Search Report and Written Opinion for PCT Application No. PCT/US2025/033044, mailed on Oct. 13, 1 2025, 22 pages.

* cited by examiner

*Primary Examiner* — Kyle J Kingsland
(74) *Attorney, Agent, or Firm* — Brake Hughes Bellermann LLP

(57) ABSTRACT

A method comprises: generating a torque command for a motor of a vehicle, the torque command generated by a motor controller based at least in part on driver input; generating, by a feedback control scheme of the motor controller, a correction for the torque command; determining, by the motor controller, whether a lash crossing event is expected to occur within a time period; in response to a determination that the lash crossing event is expected to occur within the time period, modifying the torque command with the correction to generate a resulting torque command; and controlling the motor using the resulting torque command.

26 Claims, 6 Drawing Sheets

DISTURBANCE REJECTION IN DRIVELINE

TECHNICAL FIELD

This document relates to disturbance rejection in a driveline.

BACKGROUND

A jerk problem relating to lash crossing in vehicles has been documented for both electric vehicles and internal combustion engine vehicles. When a driver tips into an accelerator pedal, or quickly tips out of the accelerator pedal, a high rate of change in the accelerator pedal depression occurs. In most vehicles, a gearbox, transmission, or other gears in the driveline has some amount of free play due to discontinuities, and this free play is sometimes referred to as lash. During operation, when gears experience a lash crossing this can be noticeable to a passenger and therefore affect the noise, vibration and harshness (NVH) characteristics of the vehicle.

In some electric vehicles, attempts have been made to address the problem of lash crossing using model-based prediction. In real time, the vehicle runs a virtual model of at least part of the driveline. The model indicates at least a rotor and gear teeth, and seeks to predict how much travel can be taken up before lash occurs. However, such models are generally designed for less complex types of drivetrains where only a single type of lash occurs. Also, the models may require more processing power on an electronic control unit of the motor, may be difficult to create, may lack robustness, and/or may rely on multiple signals to be extracted in real time.

Another previous approach for dealing with lash crossings has been used in some electric vehicles having motors on at least two axles. This approach involves preloading a motor on one axle contrary to the torque to be applied by a motor on another axle. However, this approach necessarily involves inefficient use of energy from the onboard battery and therefore negatively affects the range of the vehicle.

SUMMARY

In a first aspect, a method comprises: generating a torque command for a motor of a vehicle, the torque command generated by a motor controller based at least in part on driver input; generating, by a feedback control scheme of the motor controller, a correction for the torque command; determining, by the motor controller, whether a lash crossing event is expected to occur within a time period; in response to a determination that the lash crossing event is expected to occur within the time period, modifying the torque command with the correction to generate a resulting torque command; and controlling the motor using the resulting torque command.

Implementations can include any or all of the following features. Determining whether the lash crossing event is expected to occur within the time period comprises performing an estimation of motor torque for the time period. Performing the estimation comprises determining a slope of the motor torque, the slope corresponding to a time when the estimation is performed. Performing the estimation further comprises multiplying the slope by a duration of a prediction outlook. The method further comprises performing tuning by varying the duration of the prediction outlook. Occurrence of the lash crossing event corresponds to a change of sign of a motor torque. The correction is generated to attenuate disturbance in the motor. The feedback control scheme includes a proportional-derivative loop. The correction is continuously generated by the proportional-derivative loop during use of the motor, and whether the torque command is modified using the correction only in response to the determination that the lash crossing event is expected to occur within the time period. The correction is generated by the proportional-derivative loop only in response to the determination that the lash crossing event is expected to occur within the time period. The determination indicates that the lash crossing event is expected to occur within the time period, the lash crossing event occurring due to the driver input corresponding to a deceleration of the vehicle. The determination indicates that the lash crossing event is expected to occur within the time period, the lash crossing event occurring due to the driver input corresponding to an acceleration of the vehicle. Modifying the torque command with the correction to generate the resulting torque command comprises summing the torque command and the correction. The method further comprises disabling modification of the torque command with the correction based on an event recognized by the motor controller. The motor is an electric motor.

In a second aspect, a vehicle comprises: a first motor; and a first motor controller for the first motor, the first motor controller including a feedback control scheme; wherein the first motor controller is configured to perform operations including: generating a torque command for the first motor based at least in part on driver input; generating, by the feedback control scheme, a correction for the torque command; determining whether a lash crossing event is expected to occur within a time period; in response to a determination that the lash crossing event is expected to occur within the time period, modifying the torque command with the correction to generate a resulting torque command; and controlling the first motor using the resulting torque command.

Implementations can include any or all of the following features. The feedback control scheme includes a proportional-derivative loop. The first motor controller further includes a lowpass filter before the proportional-derivative loop. The first motor controller further includes a bandpass filter before the proportional-derivative loop. The proportional-derivative loop includes a proportional gain path. The proportional-derivative loop includes a derivative path. The derivative path includes a derivative component and a derivative gain component. The first motor controller includes a lash controller, wherein the feedback control scheme is included in the lash controller, and wherein the vehicle further comprises a first watchdog component configured to monitor the lash controller. The vehicle further comprises a second watchdog component configured to monitor the first motor controller. The vehicle further comprises: a second motor; a second motor controller for the second motor; and a vehicle controller configured to control at least the first motor controller and the second motor controller. At least the first motor is an electric motor.

BRIEF DESCRIPTION OF DRAWINGS

Like reference symbols in the various drawings indicate like elements.

DETAILED DESCRIPTION

Figure 1:
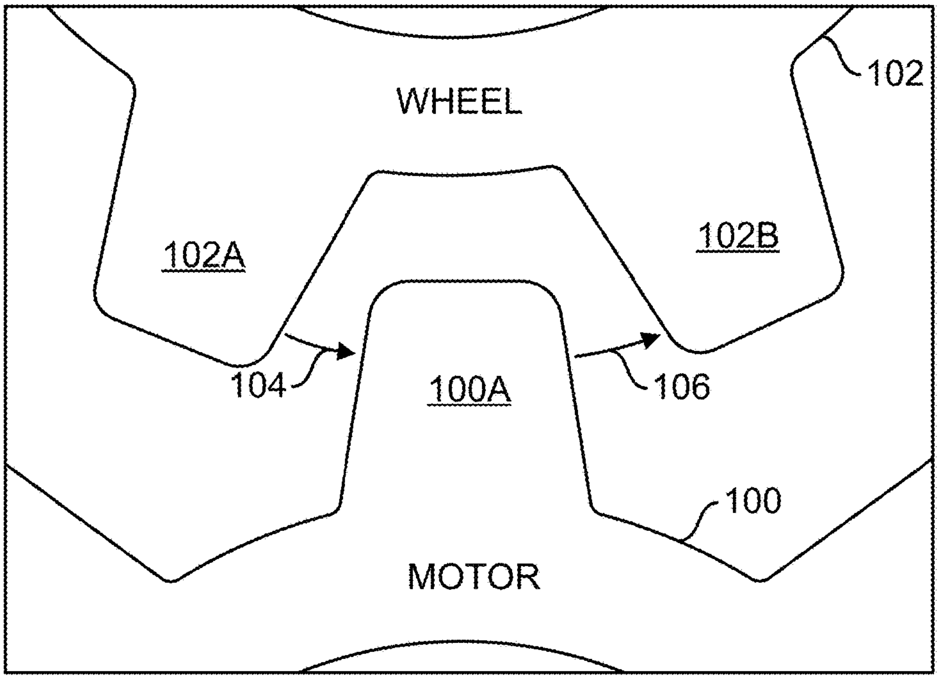
FIG. 1 shows an example of a lash crossing involving a motor gear and a wheel gear.

This document describes examples of systems and techniques for rejecting disturbances due to lash crossing. A prediction can be made whether a lash crossing event is expected to occur in the very near future (e.g., within a fraction of a second from the present time). If so, the torque command can be modified to attenuate the disturbance. The modification can be performed by adding a corrective term to a torque command, or by using any other correction (e.g., a scaling factor) that adjusts the torque command. In some implementations, torque modification is performed for an electric motor of the driveline.

Some electric vehicles have relatively complex drivelines wherein the common housing of a motor (e.g., a drive unit) contains a number of moving parts such as the rotor, a differential, and a planetary gear box, sometimes referred to as an electric motor with an active core. These components, which are mechanically interacting with each other during operation, can all have their respective lash or other discontinuities. Each piece can also or instead have unique mechanical compliances (e.g., to bend or otherwise deform). As such, these more sophisticated drive units present a fundamentally different hardware architecture than those for which existing lash control attempts (e.g., virtual models or preloaded axles) have been developed. As a result, they may present discontinuities not only in a gearbox but between any of a variety of mechanical components, such as within the planetary gears, the differential, axial gears, or helical gears. Such a drive unit can experience some amount of shuttling along the wheel shaft due to expansions and contractions due to various lashes. For example, shuttling can occur as an artifact from the use of helical gears that apply forces in multiple dimensions. Due to the above complexities, virtual modeling may be cumbersome, impractical or prohibitively ineffective. In the present subject matter, signal processing of motor speed can be performed to eliminate or reduce the above disadvantages. A lash-cross prediction can be performed to enable adjustment of a torque command before the negative effect of a lash crossing occurs. The controller can dampen any remaining oscillations in the driveline after the components (e.g., gears) reunite.

Examples herein refer to a vehicle. A vehicle is a machine that transports passengers or cargo, or both. A vehicle can have one or more electric motors. Examples of vehicles include, but are not limited to, cars, trucks, buses, motorcycles, and scooters. The number of wheels can differ between types of vehicles, and one or more (e.g., all) of the wheels can be used for propulsion of the vehicle. The vehicle can include a passenger compartment accommodating one or more persons. A vehicle can be powered exclusively by electricity, or can use one or more other energy source in addition to electricity, to name just a few examples.

Examples herein refer to a motor. As used herein, a motor can include an electric motor or any other type of motor (e.g., an internal-combustion engine).

Examples described herein refer to an electric motor. An electric motor as used herein can be any type of electric motor, including, but not limited to, a permanent-magnet motor, an induction motor, a synchronous motor, or a reluctance motor.

Examples described herein refer to a feedback control scheme of a controller. As used herein, a feedback control scheme is a control scheme for a motor controller designed to dissipate energy from the driveline. In some implementations, the feedback control scheme includes a proportional-derivative loop that makes use of at least one present condition (hence proportional) and at least one rate of change of a present condition (hence derivative). In the present subject matter, a proportional-derivative loop can optionally also be configured for performing control based on one or more other characteristic. For example, a proportional-integral-derivative loop can be used.

Examples described herein refer to a lash crossing event. As used herein, a lash crossing event involves any situation where free play occurs in a drive unit. In some implementations, a lash crossing event occurs when a first component temporarily travels freely with regard to a second component with which it is coupled. Physical components inherently have some amount of tolerance between pieces, due to various factors such as manufacturing variance and assembly facilitation. For example, when the first and second components are gears in a transmission, they are gear coupled to each other. A lash crossing event can occur when the first gear changes from being driven by the second gear to instead driving the second gear, or vice versa. As another example, a lash crossing event can occur when a previous zero torque request on either of the first or second gears changes to a nonzero torque request.

FIG. 1 shows an example of a lash crossing involving a motor gear 100 and a wheel gear 102. The lash crossing can apply to one or more other examples described elsewhere herein. This example can illustrate a gearbox of a vehicle, and only portions of the motor gear 100 and the wheel gear 102 are shown for simplicity. A tooth 100A of the motor gear 100 here meshes between teeth 102A and 102B, respectively, of the wheel gear 102. During the lash crossing, space between the teeth 102A and 102B is consumed because the tooth 100A must move from one side to another through the play that exists in the gears, for example as shown by arrows 104 and 106. For example, the tooth 100A goes from being pushed by the gear 102 to instead pushing the gear 102. In so doing, the gear 100 (here the tooth 100A) moves across an airgap in which essentially no resistive force is applied. As a result, the gear 100 of the motor accelerates quickly and may forcefully impact the gear 102 unless mitigated. The lash crossing event is here exemplified using gears of a drive unit. In some implementations, the lash crossing event can also or instead involve any other situation where free play occurs in a drive unit.

Figure 2:
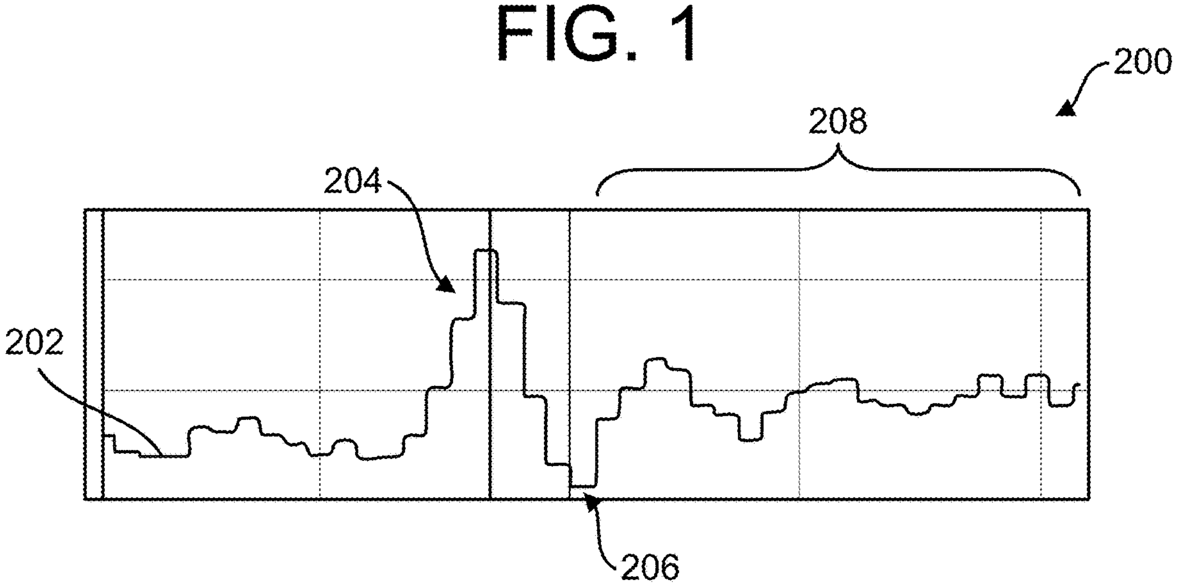
FIG. 2 shows an example of a diagram of motor speed during a lash crossing event.

FIG. 2 shows an example of a diagram 200 of motor speed during a lash crossing event. The described occurrences can apply to one or more other examples described elsewhere herein. The diagram 200 indicates motor speed on a vertical axis and time on a horizontal axis. The motor speed can be given in terms of radians per second or any similar unit, and indicates the actual speed of the rotor (e.g., as determined by a resolver, rotary encoder or any other sensor). The diagram 200 shows a graph 202 of the motor speed. A portion 204 of the graph 202 corresponds to a lash crossing event. For example, at the portion 204 the motor speed rises significantly in a relative short period of time, corresponding to a gear traversing the air gap of the lash. The portion 204 forms a relatively sharp impulse in the graph 202 which ends at a portion 206 of the graph 202 corresponding to when the soon-to-be driving gear has hit the formerly driving gear. However, after the portion 206, the graph 202 contains a portion 208 where the motor speed undergoes a ringdown. When the motor begins driving the wheel (e.g., following a period of zero propulsion or regenerative braking), the motor torque excites a portion of the drivetrain. For example, the motor may be acting on gears connected to a wheel halfshaft that has some flexibility; such excitation of the flexible halfshaft can cause the motor speed to temporarily oscillate as shown by the ringdown in the portion 208 of the graph 202.

Figure 3:
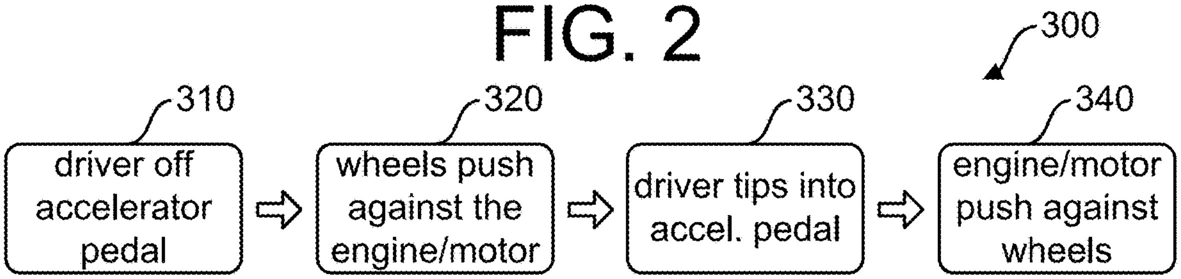
FIG. 3 schematically shows an example of a process in which lash crossing prediction can be performed.

FIG. 3 schematically shows an example of a process 300 in which lash crossing prediction can be performed. The process 300 can be applied to one or more other examples described elsewhere herein. At an operation 310, a driver can take their foot off of an accelerator pedal. This is sometimes referred to as the driver "tipping out" from propulsion (or performing a "tip out"), meaning that the driver removes the tip of their foot from the accelerator.

At operation 320, one or more traction wheels of the vehicle can push against (apply torque to) the engine or the motor of the vehicle. For example, in an electric vehicle the operation 320 can be referred to as regenerative braking. The operation 320 can occur due to a driver input (e.g., the tip out) corresponding to a deceleration of the vehicle. The transition between operations 310 and 320 can be a lash crossing event. In some implementations, lash crossing event prediction can be performed and the commanded torque can be controlled to attenuate disturbance that might otherwise occur due to the lash crossing.

At an operation 330, a driver can place their foot on the accelerator pedal. This is sometimes referred to as the driver "tipping in" (or performing a "tip in") from regenerative braking or other non-propulsion, meaning that the driver places the tip of their foot on the accelerator.

At operation 340, the engine or the motor of the vehicle can push against (apply torque to) one or more traction wheels of the vehicle. The operation 340 can occur due to a driver input (e.g., the tip in) corresponding to an acceleration of the vehicle. The transition between operations 330 and 340 can be a lash crossing event. In some implementations, lash crossing event prediction can be performed and the commanded torque can be controlled to attenuate disturbance that might otherwise occur due to the lash crossing.

Figure 4:
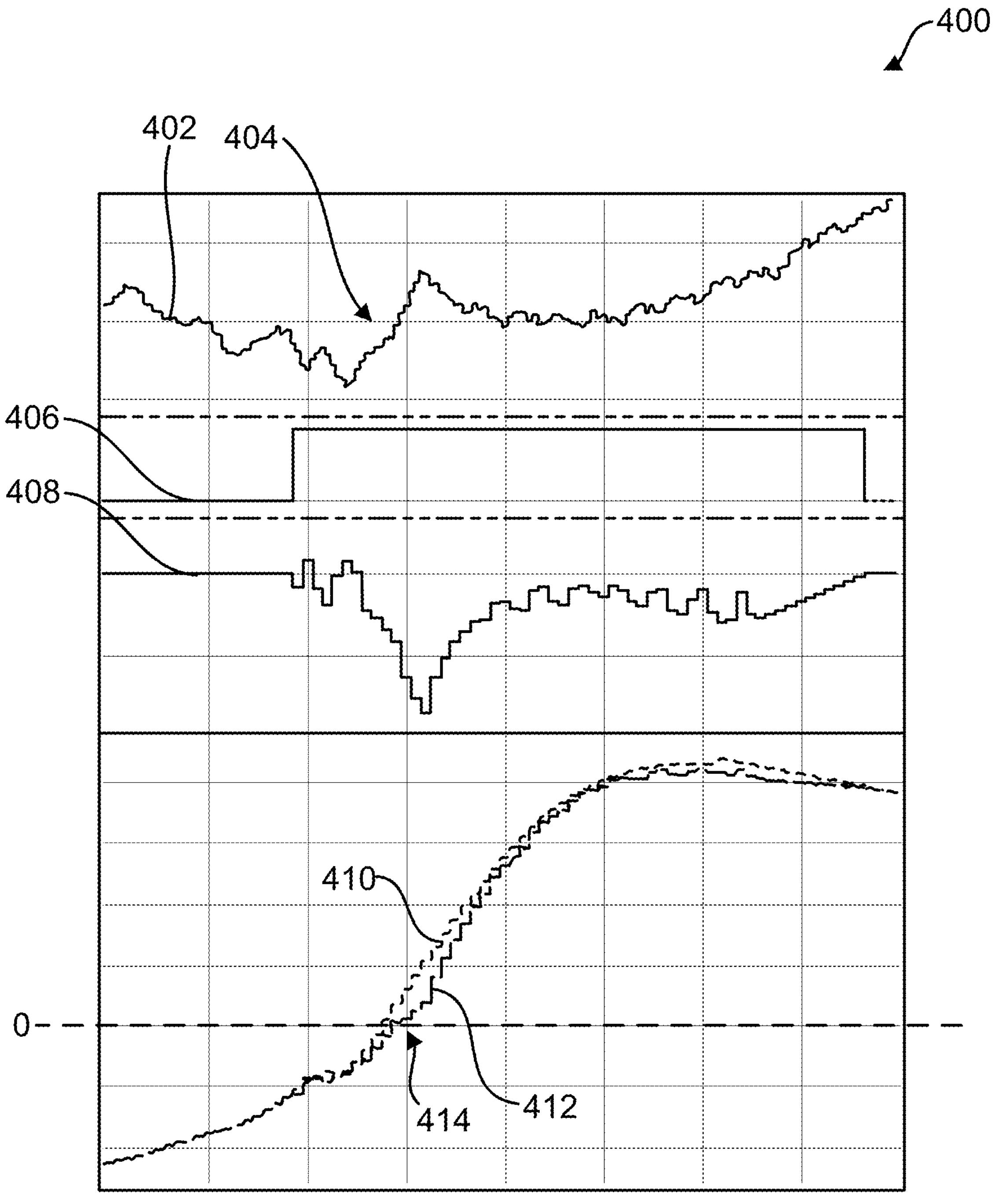
FIG. 4 shows a diagram with examples of graphs of motor speed, an on/off signal for a lash controller, a corrective term, and a resulting torque command.

FIG. 4 shows a diagram 400 with examples of graphs of motor speed, an on/off signal for a lash controller, a corrective term, and a resulting torque command. The described examples can apply to one or more other examples described elsewhere herein. A graph 402 shows motor speed. At a portion 404, a lash crossing occurs. However, because lash crossing event prediction was performed, and torque modification was applied accordingly, the portion 404 does not show the significant rise in motor speed or the ensuing ringdown that were described above. As such, the graph 402 shows that disturbance associated with a lash crossing event has been attenuated.

A graph 406 shows that a controller for mitigating lash crossing events (sometimes referred to as a lash controller) is initially off (e.g., the graph 406 has a low value). Before the portion 404 of the graph 402 the lash controller can be turned on (or otherwise activated, wherein the graph 406 has a high value) so that torque command adjustment can be performed.

A graph 408 shows a corrective term that is generated by a feedback control scheme (e.g., a proportional-derivative loop of a motor controller). The corrective term can be applied to a commanded torque to attenuate disturbance. For example, the corrective term can be generated to slow down the speed of a motor that might otherwise accelerate upon encountering the air gap during a lash crossing.

A graph 410 corresponds to commanded torque without applying the corrective term of the graph 408. A graph 412, on the other hand, corresponds to commanded torque when the corrective term of the graph 408 is applied (e.g., by adding the corrective term to a driver torque command). The corrective term can be applied upon determining that a lash crossing event is imminent. At a portion 414 of the graph 412 where the commanded torque crosses a zero line, the torque has a lower value than at a corresponding portion of the graph 410, due to application of the corrective term from the graph 408. The graph 402 of motor speed indicates that the motor does not, unlike the unmitigated situation in FIG. 2, undergo the increase of motor speed at portion 204 or the ringdown at the portion 208. That is, predicting an upcoming lash crossing event can facilitate attenuation of disturbance in the driveline.

Figure 5:
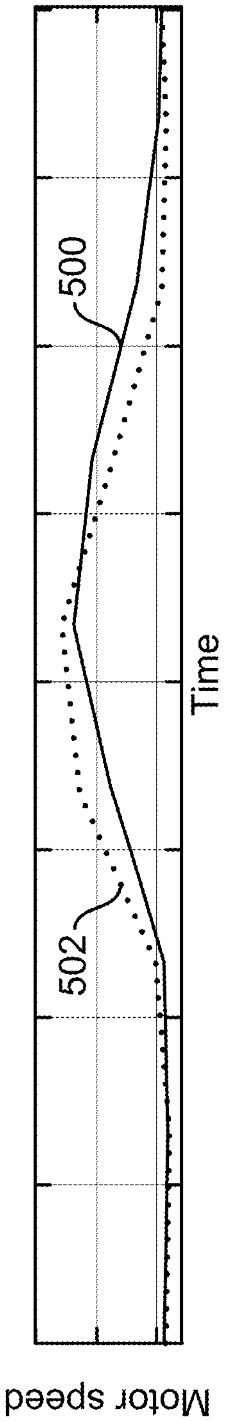
FIG. 5 shows an example of one lash crossing event.

FIG. 5 shows an example of one lash crossing event. The described examples can apply to one or more other examples described elsewhere herein. Motor speed is indicated on a vertical axis and time is indicated on a horizontal axis. A graph 500 shows motor speed as detected using a technique that performs signal processing at a relatively low efficiency. For example, processing of a signal from the sensor (e.g., by low pass filtering) can introduce latency that delays the detection of a lash crossing event. A graph 502, on the other hand, performs signal processing to filter out electromagnetic noise without overprocessing. For example, multiple noise sources may be valid, including electromagnetic noise, physical disturbances from the environment (e.g., the road) as well as acceleration driven by the vehicle body (e.g., due to the driver's control over the vehicle body impacting the rotation of axles/motors). As such, the graph 502 is able to detect the lash crossing sooner than using the technique of the graph 500. Because the lash crossing event can be detected sooner, the corrective control measures need not be as aggressive as might otherwise be the case. As such, a high frequency correction using smaller amplitude can provide a more continuous experience for the driver.

Figure 6:
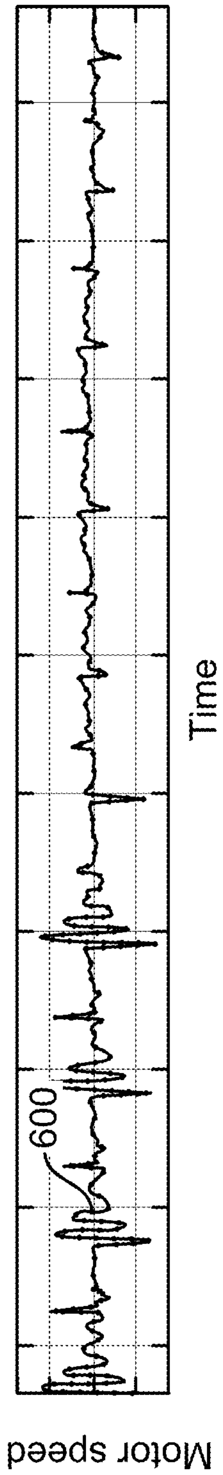
FIG. 6 shows an example of motor speed mitigated by a lash controller.
Figure 7:
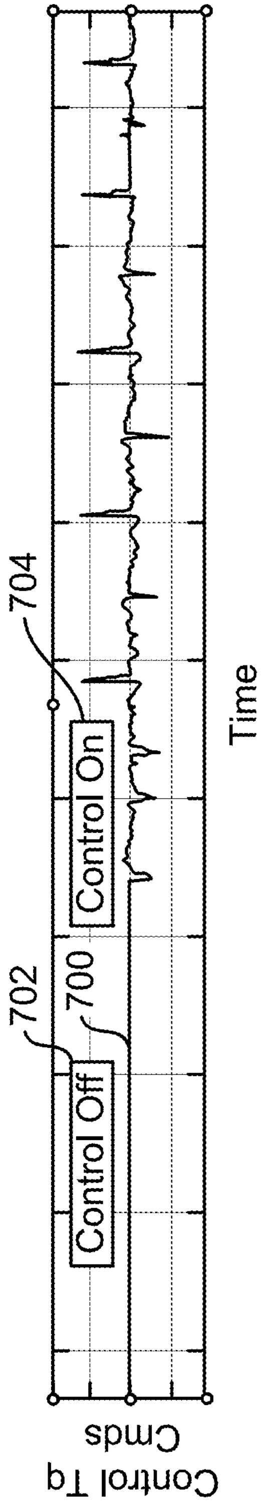
FIG. 7 shows an example of a corrective term for commanded torque.

FIG. 6 shows an example of motor speed mitigated by a lash controller. FIG. 7 shows an example of a corrective term for commanded torque. The described examples can apply to one or more other examples described elsewhere herein. A graph 600 shows motor speed against a vertical axis, with time on a horizontal axis. A graph 700 shows a corrective torque against a vertical axis, with time on a horizontal axis. The graphs 600 and 700 are occurring at the same time event. A legend 702 indicates when lash control is inactive (e.g., off or otherwise disabled). The graph 600 shows moderate fluctuation in motor speed during this time. A legend 704 indicates when lash control is active (e.g., on or otherwise enabled). The graph 600 shows much less fluctuation in motor speed during this time than when lash control was inactive. The signal provided by the graph 700 can be a high frequency, small amplitude correction. At the vehicle frame, it may not matter how quickly the undulations of the graph 700 in control on mode come and go, Rather, providing the corrective signal reduces vibration and acceleration when free play is encountered, thereby improving NVH characteristics of the vehicle.

Figure 8:
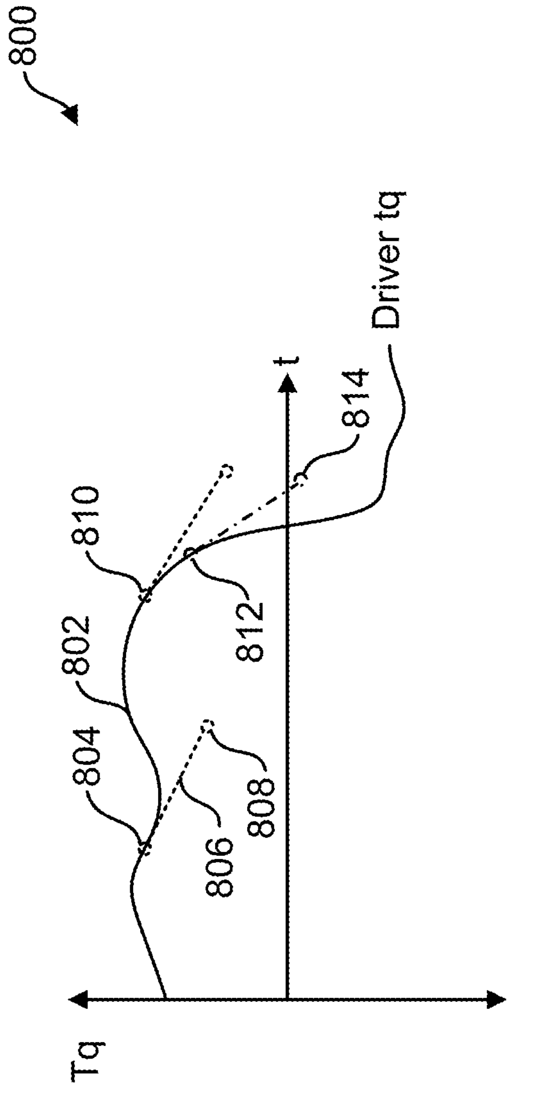
FIG. 8 shows a diagram of commanded torque with an example of lash crossing prediction.

FIG. 8 shows a diagram 800 of commanded torque with an example of lash crossing prediction. The diagram 800 shows torque 802 on a vertical axis and time on a horizontal axis. The diagram 800 illustrates an example of the driver tipping out of the accelerator pedal. For example, with an electric motor the driver can do this to request regenerative torque from previously having applied propulsive torque. Lash crossing prediction can be performed intermittently or continuously during operation. Here, only a few illustrative instances of lash crossing prediction will be illustrated for simplicity. At a point 804, the torque 802 can have some positive value. At the time corresponding to the point 804, the slope of the torque 802 at the point 804 can be determined, and is here illustrated as a tangent 806. The tangent 806 extends forward in time from the point 804 and has a particular length/duration. A point 808 at the end of the tangent 806 is a predicted (e.g., estimated) future torque, assuming the torque 802 were to continue along the tangent 806. A determination can be made whether the torque at the point 808 has the same sign as the torque at the point 804. Here, the torque at the point 804 and the torque at the point 808 are both positive, so the answer is yes. This can correspond to a prediction that a lash crossing event will not occur in the duration of the prediction outlook. Another prediction can be performed at a time corresponding to a point 810; here, the same prediction can be made, that a lash crossing event will not occur in the duration of the prediction outlook.

Another prediction can be performed at a time corresponding to a point 812. A point 814 is defined by the end of a tangent beginning at the point 812. A determination can be made, at the time corresponding to the point 812, whether the torque at the point 814 has the same sign as the torque at the point 812. Here, the torque at the point 812 is positive and the torque at the point 814 is predicted to be negative, so the answer is no. This can correspond to a prediction that a lash crossing event will occur in the duration of the prediction outlook. That is, based on the current value of the drive's torque demand, and the rate of change of the driver's torque demand, a prediction can be made what the driver's torque demand will be at some calibratable amount of time into the future. For example, if the driver is currently requesting propulsive torque, but is soon expected to request zero torque or even, in an electric vehicle, regenerative braking, a lash crossing can be expected. The calibratable amount of time can be motivated by any of multiple system states. For example, torque value, torque slope, and/or vehicle speed can be taken into account. As another example, a lash crossing can also or instead be expected if the driver requests positive or negative torque after requesting zero torque, depending on vehicle conditions such as speed or acceleration. A predicted lash crossing event can then trigger a modification of the commanded torque, for example as described elsewhere herein.

The following equation is an example of how lash crossing prediction can be performed:

$$T(i+N) = T(i) + \frac{d(T(i))}{dt} * D, \tag{1}$$

where T is the torque, i is a sample time, N is a number of samples into the future, and D is a duration of the prediction outlook. That is, a slope of motor torque can be multiplied by a duration of a prediction outlook. Tuning can be performed by varying the duration of the prediction outlook. The duration D can equal the number of samples multiplied by a sample time. That is, equation (1) can be used to predict a future torque based on the value and rate of change in the commanded torque at any time. A criterion for an upcoming lash crossing event can be expressed as:

$$\text{sign}(T(i+N)) \neq \text{sign}(T(i)), \tag{2}$$

such that a lash crossing event is predicted when equation (2) is met. The lash crossing event prediction can be performed by a motor controller in the vehicle (e.g., by a lash controller defined in the motor controller). The above prediction can be performed quickly, and the motor controller can operate in cycles of a relatively high frequency, such as on the order of below or above one kilohertz. As such, torque command modification can be enabled for brief periods of time, when necessary, with no effect on vehicle range in an electric vehicle. Moreover, the lash controller can be implemented in a motor controller, meaning that higher functionality at a vehicle level (e.g., that may be regulated by a vehicle controller) need not be configured to attenuate such disturbances. Rather, the solution to lash crossings affecting NVH characteristics can reside entirely within the drive unit itself (i.e., in a motor controller or similar circuitry).

Figure 9:
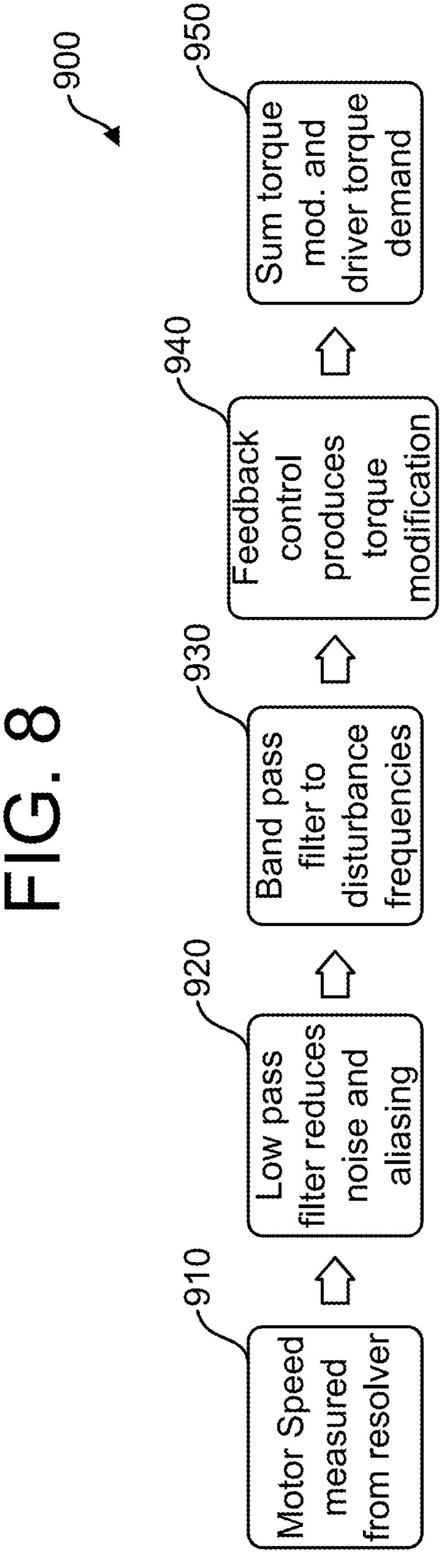
FIG. 9 schematically shows an example of a process of performing lash crossing prediction.

FIG. 9 schematically shows an example of a process 900 of performing lash crossing prediction. The process 900 can be used with one or more other examples described elsewhere herein. The process 900 can be implemented using at least some of the components exemplified below with regard to FIG. 10. The process 900 can be performed iteratively, for example as described elsewhere herein.

At an operation 910, a motor speed can be measured. In some implementations, the motor speed is measured using a resolver (or similar sensor). That is, a resolver is one potential speed source, and other examples could include encoders or voltage-based estimates. For example, the motor speed as indicated in the graph 402 of FIG. 4 can be measured.

At an operation 920, a lowpass filter can be applied to the motor speed signal. In some implementations, lowpass filtering is performed to reduce noise an aliasing in the signal. For example, this can improve the accuracy and/or speed of predicting an upcoming lash crossing event.

At an operation 930, a bandpass filter can be applied to the signal. In some implementations, bandpass filtering can be applied to target (e.g., keep only) frequencies that relate to disturbance (e.g., frequencies observed during lash cross and ringing events). In some implementations, the bandpass filter of the operation 930 can be implemented as a highpass filter followed by a lowpass filter. The signal resulting from the operation 930 can include the disturbances that a lash controller should reject, sometimes referred to as an error signal. In some implementations, the lowpass filter of the operation 920 can be applied before the bandpass filter of the operation 930.

At an operation 940, a feedback control scheme (e.g., a proportional-derivative control) can be applied to a signal. In some implementations, the feedback control scheme generates a torque modification that can be used, when applicable, to attenuate driveline disturbance. For example, the PD gains can be tuned appropriately to take the motor speed error (e.g., in the unit of radians per second) as an input and produce a motor torque modification (e.g., in the unit of Newton-meters) as an output.

At an operation 950, a resulting torque command can be generated. In some implementations, this involves summing the torque modification and a torque command from the driver. The motor controller can apply the resulting torque command to at least one motor of the vehicle.

In some implementations, the operation 940 and one or more preceding operations can be performed continuously by the motor controller, but the operation 950 where the commanded torque is actually modified is only performed in response to a determination that a lash crossing is expected to occur. That is, the PD control can continuously generate a correction for driver torque command, and the presently generated correction is used only when lash crossing circumstances are met. In other implementations, the correction is generated by the PD control only in response to a determination that the lash crossing event is expected to occur.

Figure 10:
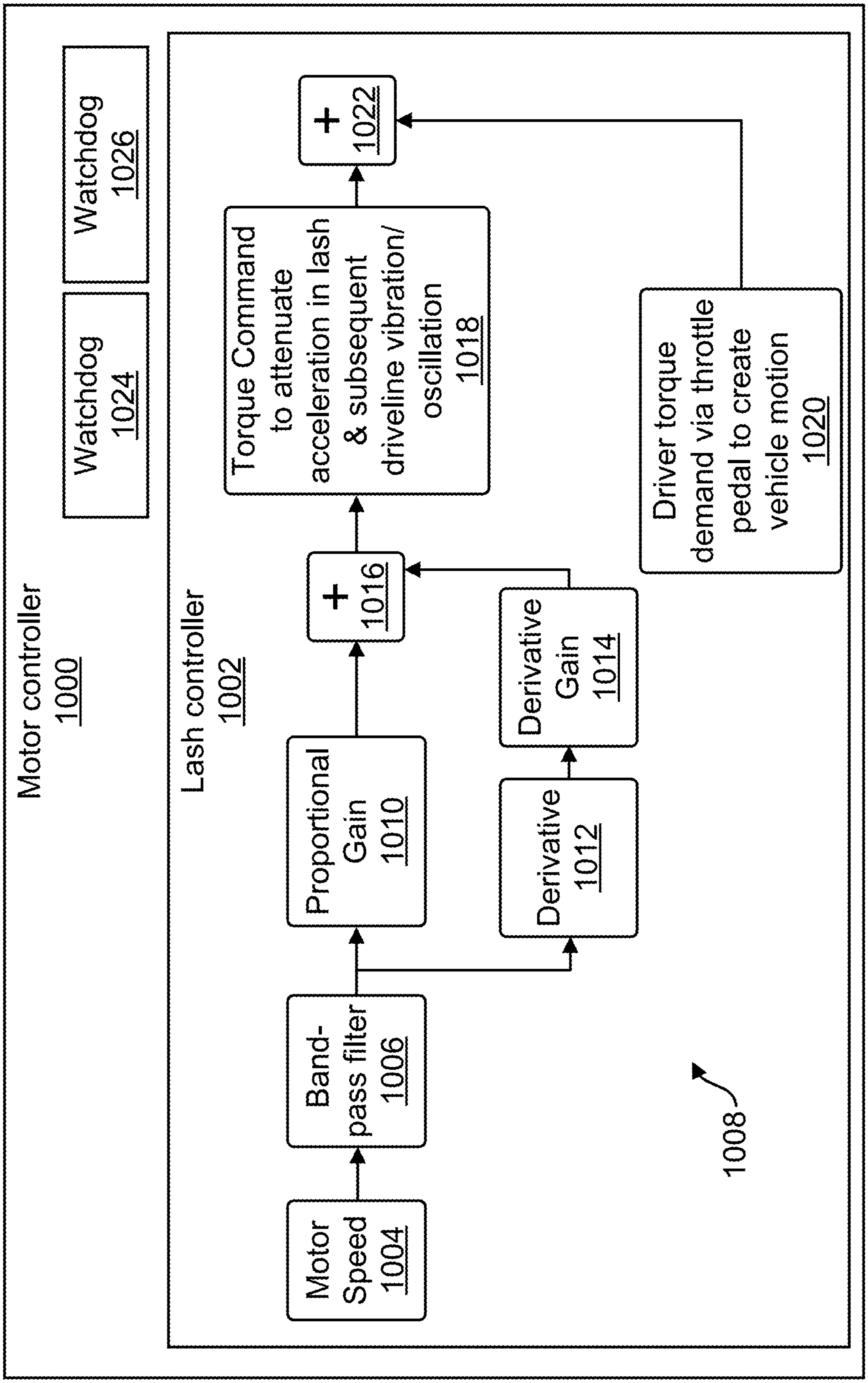
FIG. 10 shows a block diagram of a motor controller.

FIG. 10 shows a block diagram of a motor controller 1000. The motor controller 1000 can be used with one or more other examples described elsewhere herein. The motor controller 1000 can be implemented using a processor-based architecture, including, but not limited to, in form of firmware.

Generally, the motor controller 1000 can include one or more motor control algorithms that configure the motor controller 1000 for regulating the operations of a motor of a vehicle. In some implementations, such a motor can be an electric motor. For example, the motor controller 1000 can then include algorithms for controlling power electronics (e.g., an inverter) of the electric motor.

Here, the motor controller 1000 includes a lash controller 1002 that is configured for performing lash crossing event prediction and torque command modification. The lash controller 1002 uses a motor speed signal 1004 that can be generated by a resolver or any other sensor of the vehicle. The lash controller 1002 provides the motor speed signal 1004 to a bandpass filter 1006 that can be tuned to provide all signal content that signifies a lash region plus a resonance region associated with ringdown. The processed signal can be considered the error. For example, the signal resulting after the bandpass filter 1006 can be considered an error signal reflecting the disturbances the lash controller 1002 should reject. The lash controller 1002 includes a feedback control scheme to dissipate energy from the driveline. The feedback control scheme can be implemented using any form of algorithm or circuitry, including, but not limited to, as firmware in the motor controller. In some implementations, the lash controller 1002 includes a PD loop 1008 having a proportional gain path 1010 that can act like a damper on torque because it acts on motor speed, and a derivative path with a derivative component 1012 and a derivative gain component 1014, both of which act on acceleration, thereby being analogous to inertia.

By way of analogy only, the operation of the PD loop 1008 can be compared to an equation of motor such as:

$$J_{em}*\alpha_{em}=\tau_{cmd}-b*\omega_{em}-\frac{\tau_{hs}}{gr}, \qquad (3)$$

where $J_{em}$ is the rotor inertia, $\alpha_{em}$ is the acceleration of the motor, $\tau_{cmd}$ is commanded torque, b is drag or a damper, $\omega_{em}$ is an angular velocity, $\tau_{hs}$ is resistance torque from a half shaft, and gr is a gear ratio. Namely, with reference to equation (3), the derivative gain component 1014 can be considered parallel to the motor inertia ($J_{em}$) because a term that acts on the acceleration of motor speed is parallel to adding inertia to the rotor. A term that acts on angular velocity is parallel to the drag or damper (b). Both of the above terms can seek to decelerate the rotor and dissipate energy, thereby making a lash transition smoother and reducing lash speed. That is, the PD controller can act on rotor acceleration and in a sense add virtual inertia to the rotor and a damping element to the shaft. As such, the present subject matter can selectively add damper to the rotor of an electric vehicle and inertia as well.

In the lash controller 1002, an operation 1016 can combine the signals of the PD loop 1008 to generate a torque command 1018. For example, the operation 1016 can sum the signals. The torque command 1018 can attenuate acceleration in a lash crossing and in a subsequent driveline vibration/oscillation. The torque command 1018 is a candidate for being used to modify a driver torque demand 1020. For example, the driver torque demand 1020 can reflect how much the driver is currently depressing the accelerator pedal. An operation 1022 can combine the signals of the torque command 1018 and the driver torque demand 1020. For example, the operation 1022 can sum the signals.

That is, a signal from the operation 1022 can be used for controlling the motor to reduce rotor oscillation in free play and also reduce subsequent driveline oscillations. As mentioned above, a lash crossing can excite oscillations in the driveline. By taking energy out from the start of the event during the impulse, one can eliminate or reduce the requirement to remove energy when the shaft starts oscillating. That is, the shaft may oscillate only when the rotor is in free play and makes contact with sufficient energy; dissipating energy in the lash itself can lower the requirement for subsequent oscillation control.

The lash controller 1002 and/or the motor controller 1000 can provide other functionality as well. In some implementations, limitations can be defined for faulted and/or normal operating conditions. For example, the motor controller 1000 can recognize that the motor has a fault state, and can therefore modify operations accordingly (e.g., by not modifying the driver torque command during the fault state). A limitation can be applied to avoid re-entering a lash region during small driver torque operating conditions. For example, when a vehicle has more than one motor, a vehicle controller (separate from the motor controller 1000) can run a torque splitting algorithm with regard to the motors. In some circumstances, only a small amount of torque is assigned to one motor (e.g., because another motor is currently the primary traction motor), and due to inherent noise the motor controller can then choose to forgo torque modification. Limitations can be applied based on functional safety considerations. In some implementations, limitations can be applied based on vehicle traction, vehicle stability, and/or battery power controllers. For example, a vehicle dynamics system can impose torque limits on the motor, which can cause the motor controller 1000 and the lash controller 1002 to adjust their functionality.

For the above and/or other reasons, one or more functional safety methodologies can be applied to a vehicle. One or more watchdog components can be used to monitor in real time whether a controller is doing the right thing. In some implementations, the lash controller 1002 has a watchdog component 1024 that can ensure that the lash controller 1002 does not command a torque modification for NVH attributes that results in an unintended amount of acceleration from the vehicle. In some implementations, the motor controller 1000 has a watchdog component 1026 that can ensure that the motor controller 1000 does not command the wrong torque. For example, while the lash controller 1002 is disabled the watchdog component 1024 does not perform monitoring; however, this does not affect the monitoring performed by the watchdog component 1026.

Figure 11:
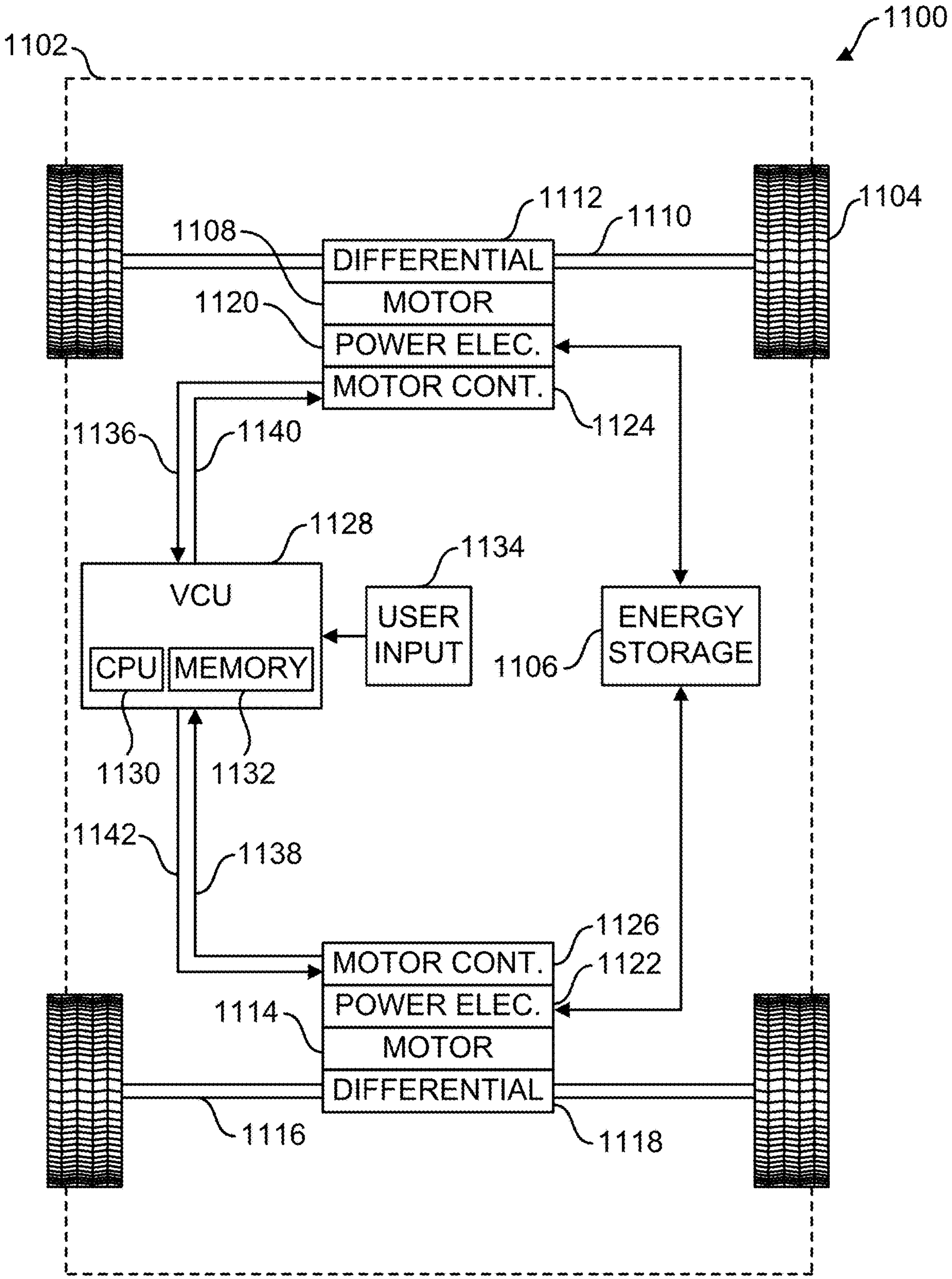
FIG. 11 schematically shows an example of a vehicle.

FIG. 11 schematically shows an example of a vehicle 1100. The vehicle 1100 can be used with one or more other examples described elsewhere herein. The vehicle 1100 has multiple electric motors (e.g., two or more) and is schematically illustrated using a rectangle 1102 and four wheels 1104. For example, the rectangle 1102 here represents a remainder of the vehicle 1100 including, but not limited to, vehicle body, passenger cabin, chassis, electrical system, and thermal system.

The vehicle 1100 can use a single power source, such as an energy storage 1106 (e.g., a battery pack of rechargeable electrochemical cells), or two or more power sources. A motor 1108 is coupled to an axle 1110 via a differential 1112. A motor 1114 is coupled to an axle 1116 via a differential 1118. The differential 1112 and/or 1118 can be any type of differential, including, but not limited to, an active core that is contained within a rotor shaft of the respective motor. Either or both of the motors 1108 or 1114 can include a planetary gearbox.

The energy storage 1106 can be coupled to the motor 1108 via power electronics 1120. The energy storage 1106 can be coupled to the motor 1114 via power electronics 1122. A motor controller 1124 insures that the energy delivered to drive the motor 1108 is of the proper form (e.g., correct voltage, current, frequency, etc.). A motor controller 1126 insures that the energy delivered to drive the motor 1114 is of the proper form (e.g., correct voltage, current, frequency, etc.). Either or both of the motors 1108 or 1114 can deliver energy to the energy storage 1106 during regenerative braking.

A vehicle controller 1128 (e.g., a vehicle control unit, or VCU) can control multiple aspects of vehicle functionality other than the respective responsibilities of the motor controller 1124 or the motor controller 1126. The vehicle controller 1128 can determine a power split between the motors 1108 or 1114 in real time based on the efficiency and power characteristics of each motor as well as the needs of the vehicle 1100.

The vehicle controller 1128 can include a central processing unit (CPU) 1130 and a memory 1132. The vehicle controller 1128 can serve as the vehicle's management system. Memory 1132, which is used to store data such as the characteristics of motors 1108 and 1114 as well as power splitting instructions, may be comprised of EPROM, EEPROM, flash memory, RAM, a solid state disk drive, a hard disk drive, or any other memory type or combination of memory types. Depending upon the type(s) of display used in the vehicle as well as the capabilities of the vehicle controller 1128, a graphical processing unit (GPU). The CPU and GPU may be separate or contained on a single chip set.

In addition to having access to the characteristics of the motors 1108 or 1114, the vehicle controller 1128 can also receive driver input from at least one input device 1134. The input device 1134 can include the vehicle's accelerator pedal and the data supplied to vehicle controller 1128 can be a torque request. In addition to providing the vehicle controller 1128 with a torque request, wheel speed and the rotor speed can be provided to the vehicle controller 1128. The wheel speed may be provided by a single sensor or using multiple sensors on corresponding wheels. The vehicle controller 1128 can acquire the current motor speed of motor 1108 from motor controller 1124, this data being provided to the vehicle controller 1128 via the vehicle's Controller Area Network (CAN) bus over signal path 1136. Similarly, motor controller 1126 may provide the current motor speed of motor 1114 to the vehicle controller 1128 via CAN bus signal line 1138. Based on the power and efficiency characteristics of motors 1108 or 1114, the speed of the vehicle and/or the speed of one or both motors, and the needs of the driver, which may be communicated to controller 123 by the accelerator pedal, the vehicle controller 1128 can determine an appropriate power split between the motors. The vehicle controller 1128 can continually update the control signals to motor controllers 1124 and 1126 via CAN bus signal lines 1140 and 1142, respectively.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method comprising:

generating a torque command for a motor of a vehicle, the torque command generated by a motor controller based at least in part on driver input;

generating, by a feedback control scheme of the motor controller, a correction for the torque command;

determining, by the motor controller, whether a lash crossing event is expected to occur within a time period, wherein determining whether the lash crossing event is expected to occur within the time period includes:

determining a current motor torque;

determining a current slope of the motor torque;

extending the current slope of the motor torque forward for a duration of a prediction outlook to determine a predicted future motor torque; and determining that the lash crossing event is expected to occur within the time period when the predicted future motor torque has a sign different from a sign of the current motor torque;

in response to a determination that the lash crossing event is expected to occur within the time period, modifying the torque command with the correction to generate a resulting torque command; and controlling the motor using the resulting torque command.

2. The method of claim 1, wherein determining whether the lash crossing event is expected to occur within the time period comprises performing an estimation of motor torque for the time period.

3. The method of claim 2, wherein performing the estimation comprises determining the predicted future motor torque.

4. The method of claim 3, wherein determining the predicted future motor torque comprises multiplying the current slope of the motor torque by a duration of a prediction outlook.

5. The method of claim 4, further comprising performing tuning by varying the duration of the prediction outlook.

6. The method of claim 1, wherein occurrence of the lash crossing event corresponds to a change of sign of a motor torque.

7. The method of claim 1, wherein the correction is generated to attenuate disturbance in the motor.

8. The method of claim 1, wherein the feedback control scheme includes a proportional-derivative loop.

9. The method of claim 8, wherein the correction is continuously generated by the proportional-derivative loop during use of the motor, and whether the torque command is modified using the correction only in response to the determination that the lash crossing event is expected to occur within the time period.

10. The method of claim 8, wherein the correction is generated by the proportional-derivative loop only in response to the determination that the lash crossing event is expected to occur within the time period.

11. The method of claim 1, wherein the determination indicates that the lash crossing event is expected to occur within the time period, the lash crossing event occurring due to the driver input corresponding to a deceleration of the vehicle.

12. The method of claim 1, wherein the determination indicates that the lash crossing event is expected to occur within the time period, the lash crossing event occurring due to the driver input corresponding to an acceleration of the vehicle.

13. The method of claim 1, wherein modifying the torque command with the correction to generate the resulting torque command comprises summing the torque command and the correction.

14. The method of claim 1, further comprising disabling modification of the torque command with the correction based on an event recognized by the motor controller.

15. The method of claim 1, wherein the motor is an electric motor, and the motor controller is configured to control the motor using a torque command generated based on a specific torque distribution process that accounts for independent front and rear wheel motors, wherein the torque distribution process further includes dynamically adjusting the torque distribution based on real-time feedback from sensors monitoring wheel slip, motor efficiency, and road surface conditions.

16. A vehicle comprising:

a first motor; and a first motor controller for the first motor, the first motor controller including a feedback control scheme;

wherein the first motor controller is configured to perform operations including:

generating a torque command for the first motor based at least in part on driver input;

generating, by the feedback control scheme, a correction for the torque command;

determining whether a lash crossing event is expected to occur within a time period, wherein determining whether the lash crossing event is expected to occur within the time period comprises determining a current motor torque, determining a current slope of the motor torque, extending the current slope of the motor torque forward for a duration of a prediction outlook to determine a predicted future motor torque, and determining that the lash crossing event is expected to occur within the time period when the predicted future motor torque has a sign different from a sign of the current motor torque;

in response to a determination that the lash crossing event is expected to occur within the time period, modifying the torque command with the correction to generate a resulting torque command; and controlling the first motor using the resulting torque command.

17. The vehicle of claim 16, wherein the feedback control scheme includes a proportional-derivative loop.

18. The vehicle of claim 17, wherein the first motor controller further includes a lowpass filter before the proportional-derivative loop.

19. The vehicle of claim 17, wherein the first motor controller further includes a bandpass filter before the proportional-derivative loop.

20. The vehicle of claim 17, wherein the proportional-derivative loop includes a proportional gain path.

21. The vehicle of claim 17, wherein the proportional-derivative loop includes a derivative path.

22. The vehicle of claim 21, wherein the derivative path includes a derivative component and a derivative gain component.

23. The vehicle of claim 16, wherein the first motor controller includes a lash controller, wherein the feedback control scheme is included in the lash controller, and wherein the vehicle further comprises a first watchdog component configured to monitor the lash controller.

24. The vehicle of claim 23, further comprising a second watchdog component configured to monitor the first motor controller.

25. The vehicle of claim 16, further comprising:
a second motor;
a second motor controller for the second motor; and
a vehicle controller configured to control at least the first motor controller and the second motor controller.

26. The vehicle of claim 16, wherein at least the first motor is an electric motor.

* * * * *